Jan. 19, 1965        G. C. TIBBETTS        3,166,148

DIAPHRAGM MEANS FOR ACOUSTIC TRANSLATING DEVICES

Filed July 6, 1962        2 Sheets-Sheet 1

INVENTOR.
George C. Tibbetts
BY
Roberts, Cushman & Grover
ATT'YS

Jan. 19, 1965 G. C. TIBBETTS 3,166,148
DIAPHRAGM MEANS FOR ACOUSTIC TRANSLATING DEVICES
Filed July 6, 1962 2 Sheets-Sheet 2
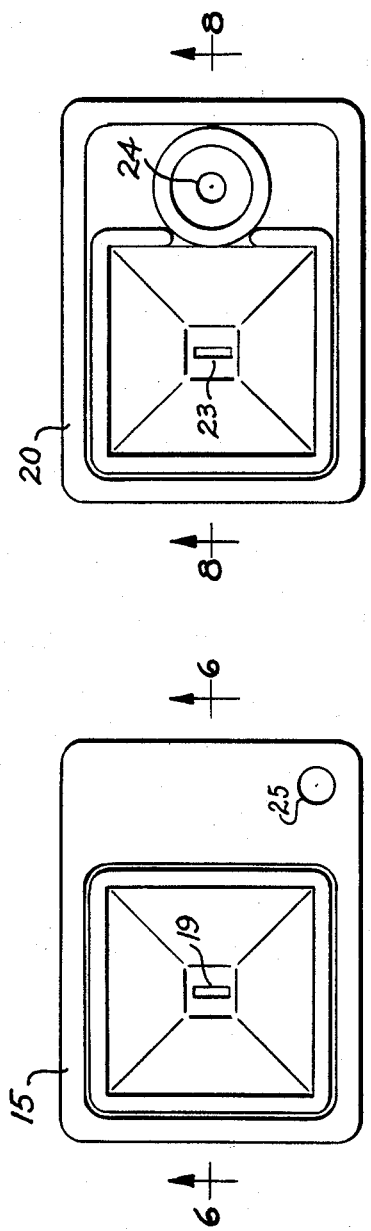
INVENTOR.
George C. Tibbetts
BY
Roberts, Cushman & Grover
ATT'YS

United States Patent Office 3,166,148
Patented Jan. 19, 1965

3,166,148
DIAPHRAGM MEANS FOR ACOUSTIC
TRANSLATING DEVICES
George C. Tibbetts, Camden, Maine, assignor to Tibbetts Industries, Inc., Camden, Maine, a corporation of Maine
Filed July 6, 1962, Ser. No. 208,057
13 Claims. (Cl. 181—32)

The present invention relates broadly to diaphragm means for acoustic translating devices, and more particularly is concerned with a sheet defining a diaphragm portion and adjacent areas as well as the method of making such sheet.

Accordingly, it is an object of this invention to provide a diaphragm means for an acoustic translating device, comprising a laminate sheet of materials of different elastic modulii such as metal foil and plastic film or coating, defining appropriate diaphragm, surround, and attachment means portions.

Another object is to provide a diaphragm means of laminated plastic and metal mounted in a peripheral supporting frame.

A further object is to provide a diaphragm means in the form of a laminate sheet of metal and plastic having one part defining a diaphragm portion and surround, and another part defining an area to support an impedance means and a surround for said area.

A further object of the invention is to provide a method for making a diaphragm means of a laminate sheet of metal and plastic with portions of the metal removed where necessary to attain desired mechanical and acoustic characteristics.

These and further objects will be apparent from the accompanying specification and drawings in which—

FIG. 5 is a plan view of the diaphragm corresponding to FIG. 1 mounted in a frame;

FIG. 6 is a section along line 6—6 of FIG. 5;

FIG. 7 is a plan view of the diaphragm means corresponding to FIG. 3 mounted in a frame; and FIG. 8 is a section along line 8—8 of FIG. 7.

Figure 1:
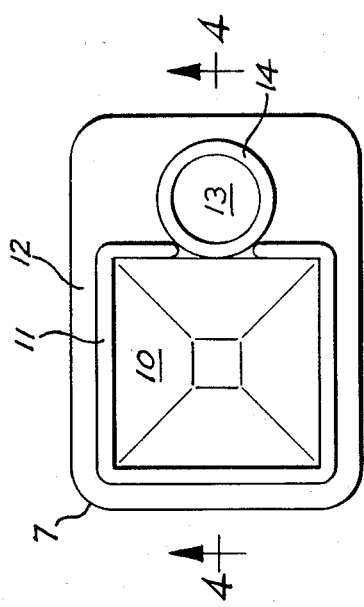
FIG. 1 is a plan view of a laminate blank formed as a preliminary step in providing a diaphragm according to the invention.
Figure 2:
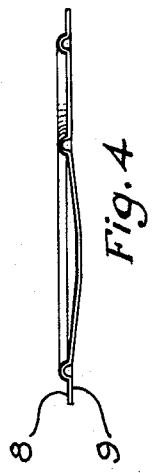
FIG. 2 is a section along line 2—2 of FIG. 1.

The invention is applicable to diaphragm means of any configuration, but for convenience is shown in the forms for the acoustic translating devices disclosed in copending application Serial No. 168,183, filed January 23, 1962. Referring to FIG. 1, element 1 may be a piece blanked out from a laminate sheet of metal and plastic. In particular, the sheet may comprise aluminum foil on which a plastic such as a fluorocarbon resin in dispersion form is coated and flows upon baking so as to be self-adhesive to the aluminum. FIG. 2 indicates the aluminum layer 2 and relatively thin plastic layer 3 laminated therewith. By the above process of lamination, the plastic layer may be obtained thinner than by adhering a layer of aluminum to plastic by an intermediate adhesive. The blank may then be formed to the entire shape desired for the diaphragm means, and FIG. 1 shows a central diaphragm portion 4, a diaphragm surround 5, and a peripheral support area 6. The diaphragm portion and surround may be pressed out of the plane of the sheet, and as shown in FIG. 2 they may extend in opposite directions relative to the plane of the sheet. After the desired shape is embossed in the sheet by appropriate cold-forming methods, the shaped blanks may be treated to substantially relieve the stresses in the plastic, for example by exposing them for a sufficient time to the vapor of an appropriate solvent or by placing them in an oven and heating to a sufficient temperature. In this manner the plastic is remolded to the shape of its own aluminum form which thereby functions as a single surface die. Thereafter the stress relieving process may be continued as desired. For example, the oven may be programmed to have a linear decrease of temperature with time until room temperature is attained.

The material of lower elastic modulus need not be thermoplastic throughout the above process. For example a plastic of lower softening range such as polyethylene may be applied to the material of higher elastic modulus as by coating aluminum from a hot solution of polyethylene. A cross-linking agent such as dicumyl peroxide may be mixed with the polyethylene solution, which agent is unaffected by the relatively low temperatures of the coating operation and subsequent storage, but which effects cross-linking, after the blank is cold formed, upon exposure to the appropriate higher temperatures necessary to effect stress-relieving and cross-linking. In this way the creep resistance of the lower softening range plastics may be markedly increased so as to render them suitable for use in the present invention, particularly when applied to the acoustic impedance means disclosed in copending application Serial No. 168,183. Alternatively no cross-linking agent need be added to the plastic coating, cross-linking subsequent to stress-relieving being obtained by subjecting the plastic face of the formed blank to appropriate radiation such as an electron beam of sufficient energy effectively to penetrate the entire thickness of the plastic layer.

Figure 3:
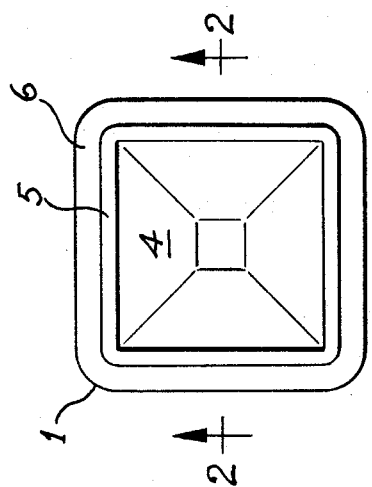
FIG. 3 is a plan view of a laminate blank for a different embodiment of diaphragm means formed according to the invention.
Figure 4:
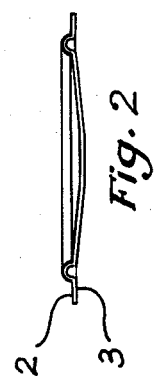
FIG. 4 is a section along line 4—4 of FIG. 3.

FIGS. 3 and 4 show a different embodiment of diaphragm means wherein the blank 7 having layers of metal 8 and plastic 9 may be shaped to have a diaphragm portion 10, a diaphragm surround 11, a peripheral support area 12, as well as a support area 13 and a surround 14 for said support area comprising part of an impedance means as discussed in copending application Serial No. 168,183.

After the blank is treated, as by being heated and then cooled to room temperature, as described above, it may be bonded into a supporting frame by an appropriate adhesive such as epoxy, to provide a source of structural integrity and a means for handling for further operations completing the diaphragm means, which becomes very delicate when so completed. Furthermore, the frame is an important part of the structure as a mounting and locating means in the complete acoustic translating device, as disclosed in copending application Serial No. 168,183.

Referring particularly to FIGS. 5 and 6, there is shown a supporting frame 15 having a portion 16 parallel to the plane of the diaphragm means and a surrounding rim 17. The portion 16 may also include an area 18 which may have an aperture 25 to carry an impedance means such as a Thuras tube as disclosed in copending application Serial No. 168,183.

After mounting in the frame, whatever part of the aluminum that is still available within the frame may be coated with a photomechanical resist. Any well known resist may be employed such as Kodak Photo Resist, an organic solvent solution of a light-sensitive plastic. A mask may then be oriented upon the diaphragm means to cover any areas that are later to be etched free of aluminum. For example, in this instance a mask would be placed to cover the surround 5 and other portions outwardly thereof, thus leaving resist only on the central diaphragm portion 4. The masked diaphragm means may be exposed to ultraviolet light or other suitable radiation to cross-link the photomechanical resist where the radiation strikes it. The mask may then be removed, and the resist developed in a suitable solvent mixture, whereby the unexposed resist is removed. It is contemplated that photomechanical resists may alternatively be employed that develop off where exposed to radiation, conversely to the above. The above coating, exposing, and developing steps may be replaced by a step of printing an ink type resist directly on the areas desired, with no resist printed on the areas to be etched free of aluminum. Then the diaphragm means may be subjected to an appropriate etch such as hydrochloric acid to etch off the aluminum wherever the resist is lacking. The frame 15 must be capable of sufficiently resisting the etch; in this particular example brass is suitable.

As seen in FIG. 6, the aluminum is etched off the surround but remains on the diaphragm portion as well as on the portion between the plastic and frame. After the etching solution is removed, further steps may be taken as necessary to prepare the diaphragm means for insertion in the acoustic transducer. For example, an aperture 19 may be punched in the diaphragm portion to permit the passage therethrough of the drive pin of the acoustic translating device for attachment to the diaphragm.

Similarly, FIGS. 7 and 8 show the different embodiment having a frame 20 with a part 21 parallel to the plane of the diaphragm and a surrounding rim 22. Holes may be punched through the sheet at 23 for the passage of the drive pin as described above, and at 24 for the passage therethrough of a locating boss of the mass element of the impedance means as disclosed in copending application Serial No. 168,183.

Many modifications of the diaphragm means and the method of making it will be apparent to the artisan. However, the invention is to be limited only by the scope of the following claims.

I claim:

1. A diaphragm means for an acoustic translating device comprising a laminate sheet including two materials of differing elastic modulii, part of said laminate sheet defining a diaphragm portion, another part restricted to the material of lower elastic modulus defining a diaphragm surround, and a third part, comprising the two materials, defining a support area exterior of the surround.

2. A diaphragm means as in claim 1 wherein the material of lower elastic modulus is a plastic self-adhering to the other material, said other material being a metal.

3. A diaphragm means as recited in claim 1 wherein the surround is etched free of the material of higher elastic modulus.

4. A diaphragm means as recited in claim 1 including a frame for supporting the sheet, and wherein portions of said support area are secured to said frame.

5. A diaphragm means as in claim 4 wherein said frame has a portion extending along the sheet, and a rim extending laterally of the sheet.

6. A diaphragm means as recited in claim 5 wherein the portion of said frame extending along the sheet comprises an area apertured to carry an impedance tube.

7. A diaphragm means as recited in claim 1 wherein said third part also defines an area comprising part of an impedance means.

8. A diaphragm means as in claim 7 wherein said area comprising part of an impedance means comprises a surround restricted to the material of lower elastic modulus.

9. A diaphragm means as recited in claim 8 wherein the impedance means surround is etched free of the material of higher elastic modulus.

10. A diaphragm means as recited in claim 1 wherein the diaphragm portion and surround extend laterally of the plane of the sheet.

11. A diaphragm means for an acoustic translating device comprising a laminate sheet of plastic and metal, the plastic self-adhered to the metal, part of said laminate sheet defining a diaphragm portion, another part defining a diaphragm surround etched free of metal, a third part defining a support area exterior of the surround, a frame for supporting said sheet having a portion extending along the sheet and a rim extending laterally of the sheet, portions of said support area being secured to said frame.

12. A diaphragm means as recited in claim 11 wherein the portion of the frame extending along the sheet defines an area apertured to carry an impedance tube.

13. A diaphragm means as recited in claim 11 wherein said third part also defines an area comprising part of an impedance means, the area comprising part of an impedance means comprising a surround etched free of metal and an area within the surround carrying an element characterizing the impedance means.

References Cited in the file of this patent

UNITED STATES PATENTS

| | | |
|---|---|---|
| 1,617,707 | Geer | Feb. 15, 1925 |
| 1,757,451 | Crane | May 6, 1930 |
| 1,988,250 | Olson | Jan. 15, 1935 |
| 2,030,501 | Cunningham | Feb. 11, 1936 |
| 2,193,399 | Fisher | Mar. 12, 1940 |
| 2,502,853 | Keddie | Apr. 4, 1950 |
| 2,704,185 | Tavares | Mar. 15, 1955 |
| 2,849,299 | Young | Aug. 26, 1958 |
| 2,869,266 | Hirdler | Jan. 20, 1959 |
| 2,966,558 | Knowles | Dec. 27, 1960 |
| 3,076,062 | Fener | Jan. 29, 1963 |

FOREIGN PATENTS

| | | |
|---|---|---|
| 513,289 | Great Britain | Oct. 9, 1939 |
| 625,014 | Great Britain | June 21, 1949 |